United States Patent [19]

Muukka

[11] 4,130,923
[45] Dec. 26, 1978

[54] APPARATUS FOR LOCATING AND MOVING HEAVY UNITS

[76] Inventor: Esko Muukka, Pähkinätie 12 C, 01710 Vantaa 71, Finland

[21] Appl. No.: 764,877

[22] Filed: Feb. 2, 1977

[30] Foreign Application Priority Data

Feb. 2, 1976 [FI] Finland ............................ 760247

[51] Int. Cl.² ......................................... B25B 27/14
[52] U.S. Cl. ..................................... 29/281.5; 403/44
[58] Field of Search ................. 29/281.4, 281.5, 281.6; 254/67; 269/242; 403/43–48

[56] References Cited

U.S. PATENT DOCUMENTS

| | | | |
|---|---|---|---|
| 1,313,450 | 8/1919 | Beals | 403/44 |
| 1,851,026 | 3/1932 | Weiskopf | 269/242 |
| 2,187,878 | 1/1940 | Hill et al. | 269/242 |
| 2,715,012 | 8/1955 | Huber | 403/44 |
| 2,813,733 | 11/1957 | Herrmann | 403/44 |
| 3,278,210 | 10/1966 | Sanders | 254/67 |
| 3,284,883 | 11/1966 | Haverfield et al. | 29/256 |

Primary Examiner—James L. Jones, Jr.
Attorney, Agent, or Firm—Wigman & Cohen

[57] ABSTRACT

Apparatus for positioning and moving heavy elements relative to one another is disclosed. The apparatus comprises a pair of spindles threadably engaged in opposite ends of an elongated protective socket member. Each spindle is provided with a pair of axially spaced slide surfaces engaging with cooperating surfaces on the socket for minimizing the flexural or bending strain on the spindle. At least one slide surface of each spindle and its cooperating socket surface is arranged to prevent disengagement of the spindle from the socket. A synchronizer element, having polygonal ends, is axially mounted in the socket member, the polygonal ends of which synchronizer element engage in differently-shaped polygonal bores in a respective spindle to permit relative rotation between the spindles of a maximum of 90° and to prevent one of the spindles from being threaded either to its extended or retracted position independently of the other spindle.

5 Claims, 4 Drawing Figures

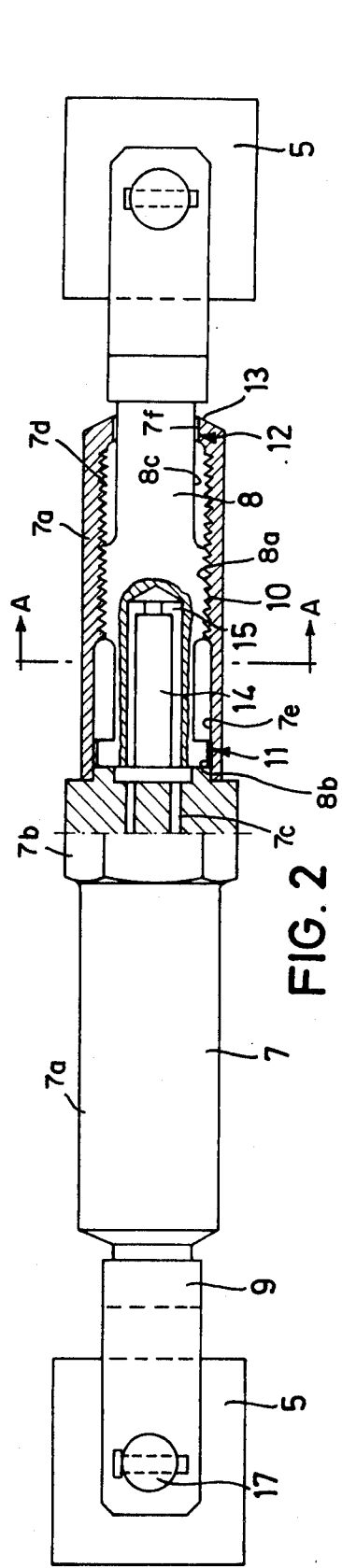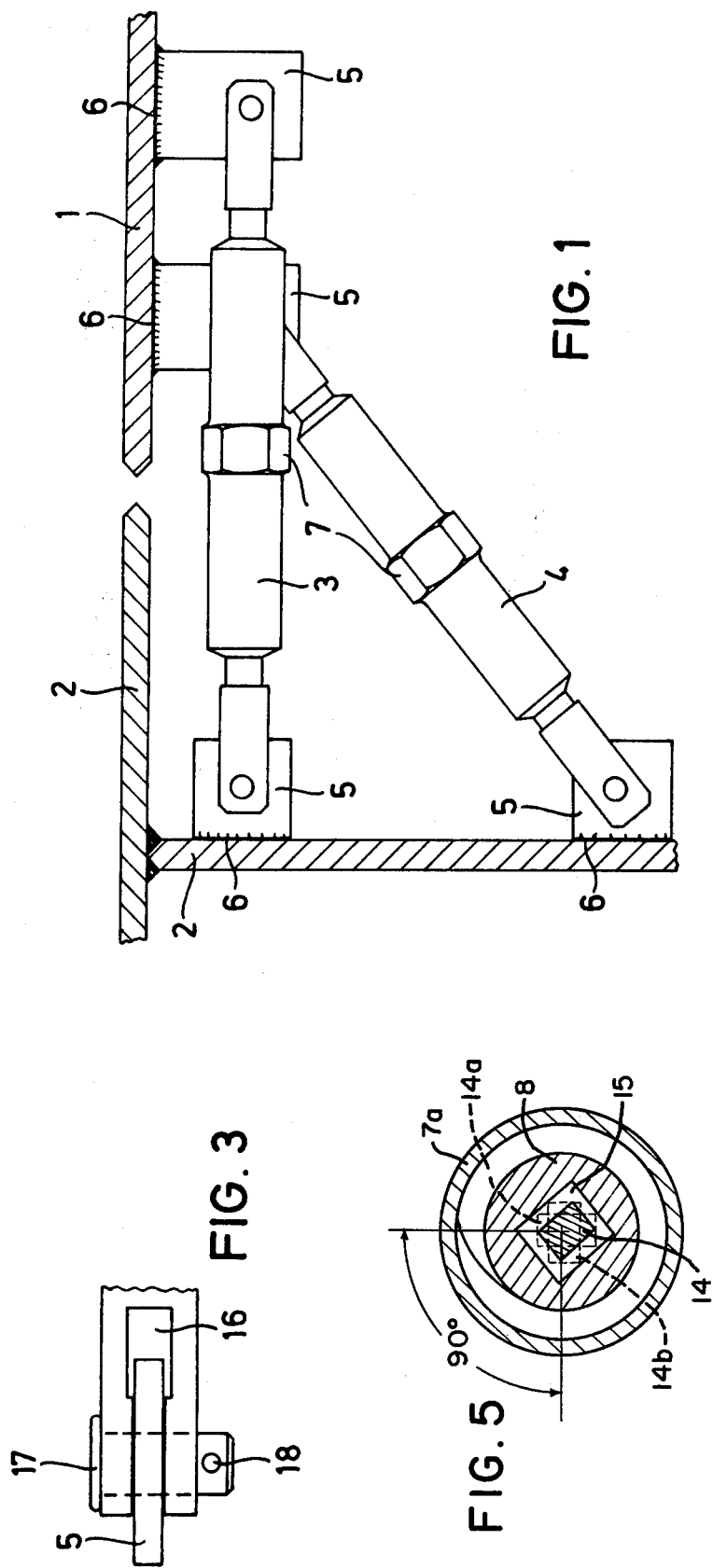

APPARATUS FOR LOCATING AND MOVING HEAVY UNITS

BACKGROUND OF THE INVENTION

In the metal working industry, there are many situations which require that heavy units or elements be positioned and moved with respect to one another. The shipbuilding industry is one good example. In shipbuilding, it is very common today that separate parts are put together and transferred as finished elements to the assembling support to be united to the body of the structure. This work demands extreme care to avoid damage to the structure body.

The devices used for this location are various, such as, tackle pulleys, cotters and jiggers. These tools are not very practical, because they were originally designed for some other purpose and must always be improved or modified in some manner depending on particular circumstances. The load capacity of these devices is, in addition, often insufficient to develop the required force and movement. Another known method is to use fixing lugs on the two moving units and a suitable hauling and squeezing device arranged between the fixing lugs. The fixing lugs are fastened by welding, gluing, for example, as disclosed in West German Patent No. DT-PS 1,932,176, or by using magnetic properties. Similar devices are used for positioning whether or not fixing lugs are provided. U.S. Pat. No. 3,182,988 discloses one special tool based on the use of a wedge device.

SUMMARY AND OBJECTS OF THE INVENTION

An object of the present invention is to provide an apparatus which facilitates accomplishing this type of work with as little effort as possible.

Characteristic of this apparatus is the construction of two spindles with a partly enclosing and protecting socket member and fastening means on the end of each spindle for connecting the spindles to fastening lugs on the heavy units. The fastening means are assembled to the lugs in a conventional manner, e.g., as by welding. Between each spindle and the socket there are arranged two slide faces provided for withstanding bending loads applied to the apparatus.

BRIEF DESCRIPTION OF THE DRAWINGS

FIG. 1 is a view showing a working operation utilizing the apparatus of the present invention;

FIG. 2 is a side view, partly in longitudinal section, of the apparatus of the present invention;

FIG. 3 is a fragmentary view of a fastening element of the apparatus;

FIG. 5 is a cross-sectional view of the device of the invention taken along line A—A of FIG. 2.

DETAILED DESCRIPTION OF A PREFERRED EMBODIMENT

Figure 4:
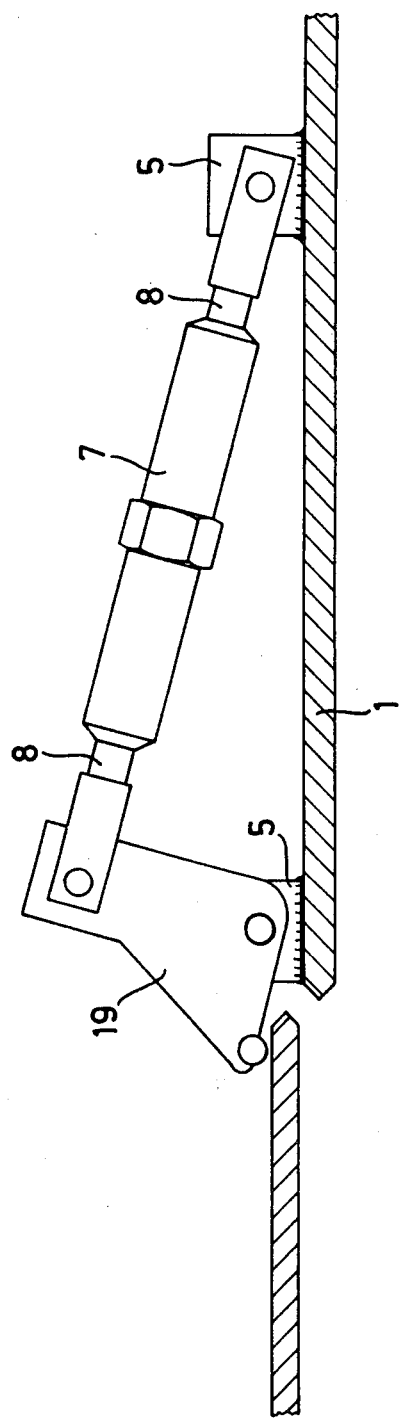
FIG. 4 is a side view showing a plane regulator connected to the apparatus of the invention.

In FIG. 1 there are shown two parts or units 1, 2 which are to be welded to one another. For this purpose, there is provided a device 3 or 4 or, if necessary, a plurality of similar devices. Fastening lugs 5 are welded to the movable units 1, 2, the weld joints being designated by reference numeral 6. The optimum fastening point must be chosen as follows: If the direction of movement is known, the device should be adjusted to its opposite extreme position. The adjustable movement will then be as long as possible and a suitable adjustment of the device 3 can be accomplished. If the direction of movement is unknown, the device should be adjusted to an intermediate position and the fastening lugs 5 welded to the moving units 1, 2 adjacent the ends of the device 3 or 4. After fastening the device 3 or 4, the position or movement of the units 1, 2 is adjusted by drawing the fastening lugs 5 away or toward each other by turning the socket 7 of the device 3, 4.

When the units 1, 2 are adjusted they will be adequately or finally welded with each other and the fastening lugs of the device are cut from the moved units 1, 2.

When the location of heavy units is carried out, there is preferably used an adequate member of installation devices 3, 4 so that the necessary forces in the required directions are accomplished. If the movement or force is insufficient, an additional device may be welded adjacent the first device, which can then be moved to a further point and so on.

FIG. 2 illustrates one of the devices 3 or 4 which includes two spindles 8, 9 arranged in a socket member 7 which partly protects the spindles. The socket member 7 comprises a pair of generally tubular sleeves 7a affixed at opposite ends of a central exterior portion 7b which is configured to permit the turning of the socket by means of a turning device. A central bore 7c extends axially through the portion 7b. In what follows, only the right-hand half of the device 3 or 4 shown in FIG. 2 will be described, it being understood that the left-hand half of the device is similarly constructed for practical reasons.

Sleeve 7a is threaded over a portion the internal wall thereof as shown at 7d for receiving an external threaded portion 8a of the spindle 8.

Between the spindle 8 and the partly protecting socket member 7, there are arranged two slide faces 11, 12 which are axially spaced from one another to minimize the strain of flexure. These slide faces 11, 12 are defined by a pair of mutually coacting, slidably related annular surfaces 7e, 8b and 7f, 8c between the spindle 8 and sleeve 7a. At least one of the slide faces 11, 12 is advantageously shaped to determine the exact extreme positions for the movement of the spindle within the socket, as well as to prevent the spindle from becoming disengaged from the socket if the threaded portions 7d, 8a are broken. In the illustrated embodiment, slide face 12 performs this function. This is very important for safety reasons, as well as to insure that the shorter thread 8a on the spindle 8 is continuously engaged with the longer thread 7d of the sleeve 7a. The sleeves of the socket partly cover and enclose the spindle so as to protect the slide faces 11, 12 and the threads therebetween. The end 13 of the socket sleeve 7a is shaped to clean welding splash and other chaff from the stem of the spindle.

A torque wrench can be used for turning the socket 7 by means of the portion 7b, and can be securely fastened to the socket. A torque arm, a moment transformer or other machine, e.g., a pneumatic device, can be utilized to provide additional working force.

A synchronizer 14 is advantageously provided between the two spindles 8, 9 and is installed in blind bores 15 in the innermost confronting spindle ends. The synchronizer 14 is rotatably received in the bore 7c of portion 7b and extends outwardly therefrom into both bores 15 of the spindles 8, 9. As shown in FIG. 5, the cross-section of the ends of the synchronizer 14 and that of the bores 15 is substantially polygonal, but dissimilar in shape. This arrangement makes it possible to determine the amount of angular rotation between the spindles and, in the case of the described embodiment, the maximum relative rotation between the spindles is limited to 90° as shown by the two dashed line positions 14a, 14b of the synchronizer 14 in FIG. 5. The synchronizer prevents the situation that one spindle is in the "out" position and the other spindle is in the "in" position which would render the device inoperative. The synchronizer also permits a length adjustment of the device 3 or 4 in a shorter period of time.

If the plates must be positioned transversely of each other, this may be accomplished according to the showing of FIG. 4 by fastening the installation lugs 5 on the same part 1 and by using a special plane regulator 19 which is utilized to force the plates into coplanar relationship. The regulator 19 has a projecting portion 20 adapted to bear against the edge of a unit 2 in the manner illustrated. Movement of these plates toward one another may be accomplished with other apparatus not shown in FIG. 4. The fastening lugs 5 can be utilized for connection of the regulator 19, one fastening lug 5 being required to secure a regulating means or bracket 19.

When the invention is compared with prior art apparatus used for the same purpose, it will be appreciated that many important advantages are achieved in locating and moving heavy units, for example:

Easier fastening and loosening than conventional devices;

All movements can be accomplished with a single device or a plurality of similar devices;

The force produced by the device is substantial compared with its size;

The device is light and can be handled by one worker;

The device can be used if necessary in a series system or side-by-side, i.e., in a parallel system; and The apparatus is only a single unit, therefore, security control is facilitated.

The method in connection with the present invention and the apparatus have been described with one embodiment, but it should be understood that the invention made apart from the foregoing, especially concerning the shape, size and method for securing the fastening lugs.

I claim:

1. Apparatus for positioning and moving heavy units comprising a socket member, a pair of spindles partly enclosed by and threadably engaged in opposite ends of the socket member, means cooperating with said spindles for synchronizing the rotation of the spindles with respect to each other, means on each of the spindles for connecting the spindles to the units to be positioned and a pair of axially spaced slide means arranged on each of said spindles for supporting transverse bending loads applied to the apparatus and an external thread on each spindle arranged between the pair of axially spaced slide means associated therewith.

2. Apparatus according to claim 1, including wiping means on the ends of said socket member for cleaning debris from the exterior of said spindles.

3. Apparatus according to claim 1, wherein said synchronizing means includes a synchronizer shaft including ends each having a polygonal cross-section and arranged between said spindles, said spindles each including an axial bore having a polygonal cross-section for receiving a respective polygonal shaft end, the cross-section of said axial bores and shaft ends being shaped to permit relative rotation between said spindles up to a maximum of 90°.

4. Apparatus for positioning and moving heavy units comprising a socket member, a pair of spindles partly enclosed by and threadably engaged in opposite ends of the socket member, means cooperating with said spindles for synchronizing the rotation of the spindles with respect to each other, means on each of the spindles for connecting the spindles to the units to be positioned and a pair of axially spaced slide means arranged on each of said spindles for supporting transverse bending loads applied to the apparatus, an external thread on each spindle arranged between the pair of axially spaced slide means associated therewith and regulator means connected to one spindle and one of said units for relatively urging another of said units into a position coplanar with said one unit, said regulator means comprising a plate, said one unit and said one spindle being pivotally connected to said plate at spaced locations, said plate having a projecting portion adapted to bear against said another unit.

5. Apparatus for positioing and moving heavy units comprising a socket member, a pair of spindles partly enclosed by and threadably engaged in opposite ends of the socket member, means on each of the spindles for connecting the spindles to the units to be positioned and a pair of axially spaced slide means arranged between said socket member and each of said spindles and an external thread on each spindle arranged between the pair of axially spaced slide means associated therewith, whereby each pair of axially spaced slide means cooperate to support bending loads applied to the apparatus.

* * * * *